UNITED STATES PATENT OFFICE.

PAUL C. SEEL, OF ROCHESTER, NEW YORK, ASSIGNOR TO EASTMAN KODAK COMPANY, OF ROCHESTER, NEW YORK, A CORPORATION OF NEW YORK.

CELLULOSE-NITRATE COMPOSITION.

1,342,602.     Specification of Letters Patent.      Patented June 8, 1920.

No Drawing.      Application filed February 7, 1918. Serial No. 215,899.

*To all whom it may concern:*

Be it known that I, PAUL C. SEEL, a citizen of the United States of America, residing at Rochester, in the county of Monroe and State of New York, have invented certain new and useful Improvements in Cellulose-Nitrate Compositions, of which the following is a full, clear, and exact specification.

This invention relates to a new cellulose nitrate composition, in which a cellulose nitrate compound is combined or mixed with other substances so that the resulting product can be advantageously used in the plastic and analogous arts, such, for instance, as sheet or film manufacture and varnish manufacture.

One object of my invention is to provide a composition of matter in which the inflammability is reduced to an important extent below that of ordinary compositions containing cellulose nitrate. Another object is to produce a composition which may be made into permanently transparent strong and flexible sheets or film of desired thinness that are substantially waterproof, are unaffected by ordinary photographic fluids and possess the desired properties of a support for sensitive photographic coatings. Another object of my invention is to produce a composition of matter capable of easy manipulation in the plastic and film making or varnish making arts; which will not injure or be injured by the substances with which it is associated during manufacture, storage or use. Further objects will hereinafter appear.

It is well known that pyroxylin compounds tend to burn with rapidity, so that when present in the form of sheets or films, such as are used in motion picture projectors for example, precautions against fire are necessary. I have discovered that a composition of matter with which the fire risk is lessened and one having the desirable qualities hereinabove enumerated can be obtained by mixing or compounding in proper proportions cellulose nitrate with chlor derivatives of the cyclic hydrocarbons $C_{2n}H_{n+3}$ and their homologues, such as chlorinated naphthalenes or anthracenes, which are only slightly volatile or non-volatile at ordinary temperatures. I furthermore select the non-inflammable members of the chlorinated series of compounds. This compounding is preferably performed by mixing the cellulose nitrate and the chlorinated compounds with a solvent common to both, such as acetone and methyl alcohol. Bodies of slight volatility which enhance the plasticity or flexibility are also present, such, for example, as the aliphatic alcohols of more than two carbon atoms like butyl alcohol or fusel oil and I may also include camphor. The butyl alcohol may be any one of the isomers comprised under that name or a mixture thereof.

The volatility of the chlorinated compound should be only slight after its incorporation in my composition, so that the loss of the small quantity which might be volatilized under conditions prevailing during its use and during the desired life of the film will not make the latter unserviceable. As applied to these compounds the term "non-inflammable" means, of course, only practical non-inflammability, the chlorinated bodies themselves not acting normally to propagate combustion therein but rather being flame resisting. They impart this quality to a very useful degree to the composition in which I incorporate them.

The following substances may be mentioned as two typical examples of the chlorinated carbocyclic compounds which I can employ in exercising my invention. One of them is an almost colorless oily liquid consisting principally of alpha monochloronaphthalene but containing small amounts of more highly chlorinated derivatives. It boils between 242° C. and 290° C., the bulk passing over between 250° C. and 275° C. The other is a translucent waxy crystalline body consisting of a mixture of higher chlorinated naphthalenes, chiefly tetrachloronaphthalenes. It has a boiling range of 310° C. to 340° C. Both of them are practically non-inflammable, the waxy body being especially so.

In carrying out one illustration of my invention I incorporate in 35 to 45 parts of methyl alcohol and 20 to 30 parts of acetone, 20 to 30 parts of cellulose nitrate, such as nitrated cotton, 2 to 3 parts of the oily chlorinated naphthalene substance mentioned hereinabove, 2 to 4 parts of camphor and 2 to 3 parts of either butyl alcohol or fusel oil. The ingredients are mixed to form a homogeneous solution or flowable mass and are filtered if desired. It will be noted that the oily chlorinated substance is thus present in an amount greater than half the weight of camphor, both in the flowable mass and in the finished film.

Another example of my invention comprises incorporating in 35 to 45 parts of methyl alcohol and 20 to 30 parts of acetone, 20 to 30 parts of nitrated cotton, 2 to 3 parts of the waxy chlorinated naphthalene substance described above, 2 to 4 parts of camphor and 2 to 3 parts of either fusel oil or butyl alcohol. The waxy compound may be dissolved in double its weight of amyl acetate prior to its addition to the mass in order to facilitate solution. The ingredients are mixed thoroughly until a homogeneous solution or flowable mass results which may be filtered if desired.

Both of these solutions are sufficiently thick and viscous to be properly flowed during sheet or film manufacture, the acetone and methyl alcohol volatilizing, but not too rapidly to impair the product. The small amount of amyl acetate in the second illustration is also volatile. The resulting films containing the other volatilized ingredients are so flexible, smooth, transparent and uniform that they may be used for any usual or preferred purpose. Due to their reduced inflammability the fire risk attendant upon their use is appreciably diminished and the precautions against ignition in consequence do not have to be quite as rigid as when ordinary pyroxylin compounds are employed. They are practically waterproof and unaffected by ordinary photographic chemicals. The chlorinated compounds, having the halogen in the ring or closed chain, are so stable that they do not liberate chlorin or injure metal or other parts with which they come in contact during manufacture and, moreover, do not chemically re-act with or injure the other bodies that they are associated with in the solution or film.

While I have hereinabove disclosed certain compositions and processes by way of example, my invention is not limited thereto nor to the proportions given therein, my experiments indicating that the proportions may be widely varied from those given and equivalent substances may be substituted without departing from the principle of my invention as defined in the appended claims.

Having thus described my invention what I claim as new and desire to secure by Letters Patent is:

1. A deposited or flowed transparent flexible film comprising cellulose nitrate, camphor and an amount of chlor derivatives of the cyclic hydrocarbons $C_{2n}H_{n+3}$ and their homologues greater than half the amount of camphor.

2. A deposited or flowed transparent flexible film comprising cellulose nitrate, camphor, an amount of chlor derivatives of the cyclic hydrocarbons $C_{2n}H_{n+3}$ and their homologues greater than half the amount of camphor, and an organic body of only slight volatility which enhances the plasticity and flexibility of the composition.

3. A composition of matter forming flexible films by flowing, comprising cellulose nitrate, camphor, an amount of chlor derivatives of the cyclic hydrocarbons $C_{2n}H_{n+3}$ and their homologues greater than half the amount of camphor, butyl alcohol and a solvent common thereto.

4. A composition of matter comprising methyl alcohol 35 to 45 parts, acetone 20 to 30 parts, cellulose nitrate 20 to 30 parts, chlor derivatives of the cyclic hydrocarbons $C_{2n}H_{n+3}$ and their homologues 2 to 3 parts, camphor 2 to 4 parts, and butyl alcohol 2 to 3 parts.

Signed at Rochester, New York, this 26 day of January, 1918.

PAUL C. SEEL.